United States Patent [19]

Schoenke

[11] 4,032,491

[45] June 28, 1977

[54] ROOFING COMPOSITION AND RESULTING PRODUCT

[75] Inventor: William Emil Schoenke, Dallas, Tex.

[73] Assignee: Butler-Schoenke Roofing Specialties, Inc., Dallas, Tex.

[22] Filed: June 6, 1975

[21] Appl. No.: 584,656

Related U.S. Application Data

[63] Continuation-in-part of Ser. No. 408,153, Oct. 19, 1973, abandoned.

[52] U.S. Cl. ............................ 260/28.5 AS; 428/489
[51] Int. Cl.$^2$ .................................... C08L 91/00
[58] Field of Search ............... 260/28.5 AS; 52/41, 52/578; 428/489

[56] References Cited

UNITED STATES PATENTS

| | | | |
|---|---|---|---|
| 2,159,586 | 5/1939 | Greider et al. | 91/68 |
| 3,277,038 | 10/1966 | Wood | 260/28.5 |
| 3,299,174 | 1/1967 | Kuhre et al. | 260/880 B X |
| 3,303,151 | 2/1967 | Peters | 260/28.5 |
| 3,373,074 | 3/1968 | D'Eustachio | 161/161 |
| 3,402,095 | 9/1967 | Varfeldt | 161/72 |
| 3,464,850 | 9/1969 | Haefele | 260/880 B X |
| 3,595,942 | 7/1971 | Wald et al. | 260/880 |
| 3,637,558 | 1/1972 | Verdol | 260/28.5 |
| 3,669,918 | 6/1972 | Raley | 260/28.5 |
| 3,707,432 | 12/1972 | Corbin | 161/141 |
| 3,856,732 | 12/1974 | Bresson et al. | 260/28.5 AS |
| 3,978,014 | 8/1976 | van Beem et al. | 260/28.5 AS |
| R27,145 | 6/1971 | Jones | 260/880 B |

FOREIGN PATENTS OR APPLICATIONS

| | | | |
|---|---|---|---|
| 740,027 | 8/1966 | Canada | 260/28.5 AS |

*Primary Examiner*—Lewis T. Jacobs
*Attorney, Agent, or Firm*—Berman, Aisenberg & Platt

[57] ABSTRACT

A roofing composition for producing a roofing membrane having good bond strength, resistance to cracking, tensile strength and hardness, comprising 5–40% of asphalt and 60–95% of a block copolymer of the A-B-A type in which each end block A is formed from a vinyl aromatic monomer and midblock B is a hydrogenated polydiene or a polymer of the ethylene/propylene or ethylene/butylene type. A white top coating may be applied over the membrane without staining being visible through the top coating. Optionally the composition may also contain nonstaining carbon black, extender pigments, synthetic or natural resins to vary membrane film properties, and conventional additives, such as stabilizers and fire retardants.

13 Claims, No Drawings

ROOFING COMPOSITION AND RESULTING PRODUCT

RELATED APPLICATION

This application is a continuation-in-part of copending application Ser. No. 408,153 filed on Oct. 19th, 1973 now abandoned.

BACKGROUND OF THE INVENTION

The present invention relates to an improved roofing composition which is useful both for re-roofing existing installations and also in the construction of new roofing. More particularly, the invention is concerned with a roofing composition which is superior to asphalt and known asphalt compositions modified with synthetic resins.

Asphalt is a common material utilized in the production of roofing coatings. Deficiencies in some physical properties of asphalt may be improved by admixing various resins, rubbers, fillers and other modifiers therewith.

When an entire surface is to be re-roofed, requirements for a suitable roofing composition are more stringent than those for new roofing. The surface to which new roofing is applied can be carefully controlled and virtually as dust, dirt and sediment free as possible. This is not true of old roofing to which a re-roofing membrane is to be applied. A coating system is usually formulated to protect and to add years of service to existing conventional-type roofing. A re-roofing membrane must be designed to tie in with existing roofing and to fill voids without requiring an extensive effort to prepare the surface to which the roofing composition is applied.

Faulty existing roofing cannot be conveniently washed without introducing water through weak portions thereof. Moreover, it is difficult to dry such washed roofing since water tends to penetrate weak spots. After applying a new coating to washed faulty roofing, any non-removed moisture can impair the effectiveness of the coating applied thereover.

It is known to produce a roofing utilizing felts and hot asphalt or tar in alternate layers or utilizing base felts mopped in with asphalt or tar. A protective layer of gravel or crushed slate or the like may be applied to the top of the upper bituminous layer to inprove the weathering properties of the roofing and to change the color of the roofing from the black color of asphalt.

One known approach to modifying asphalt by the addition of synthetic resins is disclosed in U.S. Pat. No. 3,345,316 to Nielsen. This patent discloses asphalt compositions stated to be suitable for roofing purposes as well as for special binders. The composition of this patent is said to contain three essential components:

a. 45–75% by weight of an asphalt of the group consisting of straight run asphalt having a viscosity between about 350–450 SSF at 210° F., blown asphalt having a softening point between about 110° F. and 185° F., and mixtures thereof;

b. 15–35% by weight of chlorinated polyphenyl resins containing from about 30% to about 65% by weight of chlorine;

c. and 10–30% by weight of a block copolymer of the group consisting of copolymers having the general configuration

A-B-A wherein each of A is a polymer block of a vinyl arene and B is a polymer block of a conjugated diene; the average molecular weight of A being between about 8,000 and 45,000, the average molecular weight of B being between about 40,000 and 125,000, the total A content of the block copolymer being between about 23 and 40 weight percent; and hydrogenated derivatives of such block copolymers.

Muir (U.S. Pat. No. 3,755,231) concerns process-equipment-coating compositions containing terminally-reactive diolefin polymer, curing agent for that polymer, a bituminuous substance, an $A(BA)_n$ block copolymer, solvent for the latter and, optionally, a reinforcing filler, such as carbon black or silica. In the block copolymer A can be polystyrene, and B may be an ethylene-propylene copolymer.

Holden (U.S. Pat. No. 3,265,765) provides elastomeric block polymers A-B-A which may be dispersed in asphalt to improve hot temperature viscosity and low temperature ductility and flexibility (column 7, lines 36 and 38). The elastomers may be mixed with the usual rubber compounding materials, such as carbon blacks (column 7, lines 44 and 45). In these block polymers each A can be an alkenyl aromatic hydrocarbon connected by a block of a polymerized conjugated diene (column 2, lines 39 to 46).

Problems with currently-employed re-roofing compositions and factors which contribute to these problems are readily appreciated by considering literature provided on one such composition. In the remainder of the BACKGROUND only the bracketed text is commentary; the rest is from the noted literature.

Probably the most important problem to consider when reroofing becomes a necessity is . . . Should we reroof with the same product that has failed?Asphalt and coal tar, popular roofing of the past, are subject to deterioration from sunlight, water, and movement . . . the very elements they should be providing protection from. With [this roofing system] you can make your building watertight without removing the existing roof.
. . .
[This roofing system] is a one-part moisture cured urethane system that is compatible with asphalt and coal tar.

This system which has excellent adhesive properties to most surfaces . . .
   is flexible . . . will stretch and move as the roof moves.
   is watertight . . . forms a continuous envelope over a roof surface.
   is less costly than replacing old roofing . . . with proper surface preparation can be applied directly over old roofing.

PREPARATION

1. Smooth Surface (no gravel) Roofs: Care shall be taken to remove all loose, unbonded roofing. Surface shall be thoroughly broomed, hosed, and vacuumed to remove all dirt or loose contaminants. [This requirement is for an expensive cleaning job, the object of which is never really achieved. Elastomeric systems tolerate very little dirt. Hosing or washing down a leaking roof area is just not practical. The interior damage or problems created by leaks is generally intolerble. During aging of an asphalt roof, the oils therein evaporate out with consequent quality deterioration. When this takes place, moisture enters deeper into the system, which naturally takes longer to dry out before a new system can be applied. In most areas the time lag for drying is too much of a handicap. With a one-part moisture cured urethane, moisture present in the substrate is a source of problems. This particular type product requires moisture for curing, but it should be introduced on the top side of the film. The solvent in the system picks up moisture present in the substrate and, by a wicking action, brings it up to the bond line, thus preventing maximum bonding of the new elastomeric membrane to the substrate.] Any oil or grease must be removed. [This is not possible — the membrane will not bond, and extra cost of blocking the contaminated area is entailed before reapplying the system.] Properly vent any areas expected to be damp.

Wet or unsound areas of roofing and insulation must be removed and replaced. Apply [this roofing system] at the rate of 4 gallons per 100 square feet. [The indicated single application is probably possible in cool temperatures, but, in warm or hot temperatures, escaping $CO_2$ gas will blow pin-holes throughout the membrane. Then, a perforated and unacceptable membrane results.] (Rough surfaces may require additional material). Make certain all areas have minimum 60 mil coverage.

2. S.I.S. or Shingle Roofs: Same as above.

3. Gravel Surfaced Roofs:

Procedure No. 1 — Remove all gravel down to clean, dry smooth felt. [This requires spudding the old gravel off — an expensive and slow process.] Thoroughly broom, blow, or vacuum all loose dirt and debris prior to proceeding with application. Wet or unsound areas of roofing and insulation must be removed and replaced. Properly vent any areas expected to be damp. If surface is extremely uneven, apply a new layer of cap sheet as a proper surface for [this roofing system. In spudding, the finished surface could require a new cap sheet, which involves additional cost.] Overlap joints of cap sheet by 4 inches. Apply [this roofing system] at the rate of four gallons per 100 square feet. Make certain all areas have a minimum coverage of 60 mils.

Procedure No. 2 — Thoroughly remove all loose dirt, gravel or other surface contaminants. [This requirement is not possible without spudding. The system will not tolerate remaining dirt and contamination. Consequently, the bond is limited to that achieved with remaining gravel or clean areas of asphalt.] Remove and replace any areas of wet or unsound roofing or insulation. Completely fill in all roof areas with [this roofing system ] beyond the height of the gravel by 60 mils minimum. [Someone just has not thought this requirement out. A single piece of gravel protruding one-quarter of an inch requires 250 mils to bring it flush. Requiring a further 60 mils above the top of the gravel to complete the system would be impractical. There is no way to fulfill this specification at a cost the owner can afford. In going over roofs that have specification gravel embedded, the depth for filling to the top of gravel is far greater than one-quarter inch.].

NOTE: All cracks and splits must be prestriped with minimum 55 mils of [this roofing system], then recoated. . . .

SUMMARY OF THE INVENTION

It is a primary object of the present invention to provide a novel, improved asphalt-containing roofing composition which results in a roofing having improved properties.

Another primary object of the invention is to provide an asphalt-modified resin composition useful in producing a roofing membrane having good resistance to cracking, high tensile strength and hardness and good weathering properties.

The present invention relates to a composition which may be employed to produce a roofing membrane either for a new structure or for an existing roofing system. The coating system may be characterized as a true elastomeric system although it contains asphalt.

Improved roofing compositions contain, as principal components, asphalt and a block copolymer, the block copolymer being utilized in a substantially larger amount relative to the amount of asphalt than is disclosed in the aforementioned U.S. Pat. No. 3,345,316 (Nielsen).

Another factor of major importance in a commercial sense is the cost of the composition, since asphalt is relatively inexpensive compared to the cost of the block copolymer.

Rather than employing asphalt in an amount of at least 50% greater than the amount of block copolymer and up to an amount of 7½ times the amount of block copolymer as disclosed in the Nielsen patent, it has been found advantageous to utilize the block copolymer in an amount of at least 50% greater than the amount of asphalt. Thus, while the Nielsen patent may be characterized as employing the block copolymer to modify the asphalt, the present invention, in effect, employs a relatively small amount of asphalt to modify the block copolymer.

In the present invention, the principal components comprise:

a. 60–95% by weight of block copolymer having vinyl aromatic end blocks and a saturated mid-block, and b. 5–40% by weight and preferably 5–35% by weight of asphalt having a softening point of 100° to 175° F., with the percentage being based on the total weight of these two components.

The block copolymer is elastomeric and functions as a film former and binder for various other components, such as pigments, resins, etc., of the composition. The ashalt serves as a plasticizer, cost reducer, adhesion promoter and film-forming improver of the composition; it further controls (by reducing) cracking. Various additives, such as extender pigments, carbon black, synthetic and natural resins, flame retardants, and stabilizers, such as anti-oxidants, anti-ozonants, and ultraviolet light stabilizers, are optionally incorporated in the composition.

When the composition of the invention is utilized to produce a roofing or re-roofing membrane, it is unnecessary to apply a gravel or similar top layer. The weight of the roofing is thus materially reduced. In addition, it is a material advantage of the invention that a white or other light-colored top coating may be applied over the membrane without having the membrane stain the top coating. When a light-colored top coating is to be applied, the amount of asphalt in the roofing membrane should be below about 35 weight %, since staining of such top coating tends to occur at higher asphalt concentrations. The top coating is applied from a solvent-based coating composition, rather than from a water-based coating composition.

The physical properties of the compositions vary, depending upon the relative proportions and the particular additives, but it is readily possible to achieve elongations above 400%, tensile strengths of as much as 4,000 pounds per square inch, and a hardness as high as Shore A of 80 and above.

A basic object of this invention is to provide a truly elastomeric system which is applicable in the same manner as a complete new roofing membrane and is compatible with conventional roofing systems even after such conventional systems have been in use for a number of years. A further object is to present a necessary barrier to the elements with a system which will function over existing conventional-type roofing and independent of such roofing.

Another object is to provide a roof-coating system which is readily modified to yield a membrane suited for the range of temperature, humidity, rainfall, UV and ozone exposure and wind conditions generally prevalent in the specific area in which the membrane is to be prepared and, more specifically, at the time at which the coating system is applied. Existing conditions affect the application of the coating and its longevity. Communities less than 300 miles apart may well require different modifications in coating formulations to obtain the best possible results.

Still further objects of this invention include an elastomeric-based system which is applicable over built-up roofing in the form of a coating composition which:

a. is compatible with asphalt, b. can be poured, sprayed, brushed or applied by roller, c. has a viscosity which allows spraying at all temperatures within human limits, d. lends itself to high-speed production and can be handled with a minimum of problems — it is difficult for a mechanic to make an improper installation, e. has excellent stability, f. provides a membrane with good ozone and oxidation resistance, g. provides a membrane which has been exposed to lemon-size hail with no resulting damage, h. provides a membrane with good ultraviolet (UV) resistance [UV is generally very damaging to roofing systems and the subject compositions were tested at locations (El Paso and New Mexico area) wherein there is extreme UV exposure], i. provides a membrane with good water resistance and sufficient tensile strength to eliminate further need for reinforcement, j. provides a membrane to which a top coat is easly bonded with minimum staining of the top coat, k. provides a membrane with good bond strength to insulating board, felts and asphalt, l. cures rapidly without curing or vulcanization agents [elastomeric systems subjected to movement (elongation) during initial cure yield inferior films since molecular structure is changed; under controlled conditions 80% cure (not to be mistaken for drying) is achieved in 4 hours or less, and a superior finished film results; a high cure rate prevents moisture from entering the film when humidity is high or when it rains during the curing period — also, while solvent is evaporating, moisture readily enters], m. has a high tolerance for dirt-contaminated surfaces [regardless of the spohisticated equipment and methods (including washing with a hose) used for preparing an old surface, dirt and other contaimination on a conventional roofing system present a major obstacle to good bonding; an old gravel leaking roof cannot be thoroughly washed because of the water damage such washing will cause in the building], and n. provides a base which cures and completely blocks built-up roofing to help prevent staining. Additional objects are apparent from the following description.

DETAILED DESCRIPTION OF THE INVENTION

The principal component of the roofing composition is the elastomeric block copolymer. The block copolymer has the general configuration A-B-A, where each end block A is a block of a vinyl aromatic compound, preferably a polystyrene block, although homologs of styrene and derivatives thereof, such as ring-alkylated styrene, e.g., vinyl toluene, or α-alkylated styrene, e.g. α-methyl styrene, are alternatively employed to produce the end blocks. The mid-block B is a polymer produced from a mixture of olefins. The olefins are preferably α-olefins with from 2 to 5 carbon atoms per molecule, although monomers with more carbon atoms are optionally used together with one or more preferred olefins. The particularly preferred α-olefins are ethylene and butene (especially isobutylene). Illustrative block copolymers thus comprises polystyrene-ethylene/butylene-polystyrene and polystyrene-ethylene/propylene-polystyrene. The polymeric vinyl aromatic end blocks have average molecular weights between, e.g., about 8,000 and 45,000, and the midblock B has an average molecular weight of between, e.g., 40,000 and 125,000. Preferably the end block comprise about 23 to 40% by weight of the total block copolymer. The ratio of monoalkenes in the midblock is not critical as long as the midblock is elastomeric, and the mole percent of each monoalkene therein can vary from virtually zero to about 95 percent; i.e. there can be as high as 95 mole percent of a single monoalkene, e.g. isobutylene.

Processes for producing such block copolymers are known in the art. One such process involves sequential addition and polymerization of the components of each block utilizing a catalyst, such as a lithium alkyl, to form a first polymer block, e.g. polystyrene-Li, adding an α-olefin monomer mixture, continuing the polymerization to form the mid-block onto the initial block, and adding more of the vinyl aromatic monomer to form the second end block.

The block copolymer, in which midblock B is virtually completely saturated, is alternatively prepared using one or a mixture of conjugated dienes, e.g. butadiene and isoprene, to form an A-B-A block copolymer and subsequently hydrogenating (by known processes) the B-block to remove unsaturation therefrom. Freedom of the B-block from olefinic unsaturation results in improved properties, such as oxidation and ozone resistance, of the polymer. The hydrogenation is preferably carried out to an extent of at least about 50% of any original unsaturation when the midblock is prepared from a diolefin.

As diene polymerization has a far greater propensity for branching and cross-linking than does monoalkene polymerization, hydrogenating polydiene to remove olefinic unsaturation therefrom does not lead to polymer having either the same chemical structure or the same physical properties as that obtained by polymerizing a mixture of monoalkenes. Although both are suitable for midblock B of the A-B-A block copolymer which is used in this invention, the block copolymer with a poly(monoalkene) midblock is preferred and has clear-cut advantages, including lack of need hydrogenation.

One especially preferred block copolymer for use in the present invention is available from Shell Oil Company and is designated KRATON G rubber GXT-0650 (now called KRATON G 1650 and formerly referred to as KRATON G 6500 and KRATON GX 0650). This polymer has polystyrene end blocks and an ethylene/butylene rubber midblock and is characterized by good resistance to ultraviolet degradation, ozone attack and oxidation. [KRATON G rubber GXT-0650 is a thermoplastic of the KRATON G series and possesses the properties that are common to thermoplastics of this series. A preliminary technical release (Technical Bulletin SC: 70–58, "Everything you always wanted to know about Shell's KRATON G Thermoplastic Rubber", Shell Chemical Company Polymers Division, November 1970 and similarly-entitled release dated April 1971) states that KRATON G series thermoplastics have EPR-type centerblocks in contrast to the diene-type centerblock of prior KRATON polymer. Shell's Technical Bulletin SC: 71—70, November 1971, confirms that "KRATON G rubber GXT-0650 is a developmental A-B-A type block polymer in which A represents polystyrene endblocks and B represents a polyolefin midblock. It is a two-phase thermoplastic material consisting of polystyrene domains in a rubber matrix. . . . To assist rapid dissolution and easy processing, KRATON G rubber GXT-0650 is supplied as a white, free-flowing crumb of specific gravity 0.91." Shell's Technnical Bulletin SC: 73–21, October 1973, further states:

All types of KRATON thermoplastic rubbers differ fundamentally in molecular structure from typical plastics of commerical rubbers (homopolymers or random copolymers) in that the molecules consist of individual chains of three blocks — an elastomeric block in the center and a thermoplastic (polystyrene) block on each end. IN KRATON G's the elastomeric midblck is an ethylene-butylene rubber. (In other series of KRATON rubbers there are two basic types of molecules, all with polystyrene endblocks; one type has polybutadiene midblocks and the other has polyisoprene midblocks.)] This polymer is available in crumb form and is easily dissolved in solvents, such as xylene, In addition to the above-mentioned dersirable properties, this polymer has high tensile strength, moderately high elongation, and curing is not necessary for physical-property development. On the other hand, this polymer has poor bond strength to various materials, such as wood, metals, masonry surfaces and conventional roofing materials, e.g. asphalt, roofing felts, shingles, etc. Another very important deficiency of this polymer is an inherent tendency to crack, known in the art as mud-cracking, when laid in the form of a solvent film which is utilized as a roofing composition.

In accordance with the present invention, the above-mentioned deficiencies of utilizing such block copolymers in roofing compositions is overcome by modifying the elastomer by adding thereto a minor proportion, i.e. from 5 to 40% by weight, of asphalt, based on the weight of asphalt and elastomer. The asphalt substantially eliminates any mud-cracking problem and in addition results in an improvement in bond strength to the afore-mentioned materials.

The asphalts used to modify the block copolymer preferably have properties falling within the following ranges:

| | | |
|---|---|---|
| (a) | softening point, R&B, ° F. | 100–175 |

-continued

| | | |
|---|---|---|
| (b) | penetration at 77° F., mm. | 70–125 |
| (c) | viscosity (kinematic), stokes at 140° F. | 775–925 |
| (d) | specific gravity, 60° F. | 0.9–1.115 |

Fillers, primarily extender pigments, are optionally incorporated in the roofing compositions for cost reduction, physical-property control, fire-retardant improvement, wear-resistance improvement and film-hardness improvement. Useful extender pigments include asbestos (both as short and long fibers), magnesium silicate, calcium carbonate, micronized silicas, barium sulfate and hydrated clays. These additives impart one or more of the previously-mentioned advantages for such fillers. For example, clays help reinforce obtained films and improve fire resistance. On the other hand, micronized silicas have little effect on film reinforcement, but increase hardness. Calcium carbonate is a presently-preferred filler, since it does not appreciably alter the film hardness. The typical useful calcium carbonate comprises 96% by weight of calcium carbonate, about 3% magnesium carbonate, and the remainder (in small amounts) silica, alumina, iron oxide and moisture.

The fillers, when employed, may be employed in an amount of about 25 to 150 parts per 100 parts of combined block copolymer and asphalt and preferably in an amount of about 75 parts per 100 parts of copolymer and asphalt.

For pigmentation, carbon black of the medium thermal non-staining types is utilized. This carbon black is employed to screen ultraviolet light and for this purpose is effective at a concentration of 15 parts by weight to 100 parts by weight of block copolymer. If the product specification calls for a black finish, the concentration of carbon black may be increased to 50–100 parts by weight to 100 parts by weight of block copolymer. However, 15 parts by weight of carbon black is sufficient to screen ultraviolet light until the protective top coat is applied onto the membrane. This type of carbon black is selected for its lack of staining a white finish top coat, and its ease of dispersion during the manufacturing process. Typical properties of this carbon black are as follows:

| General Properties | |
|---|---|
| Blackness Index (mass type) | 25 |
| Particle Diameter, microns (mμ) (arithmetic mean) | 300 |
| Surface Area, Square Meters per gram (based on surface area by nitrogen adsorption [B.E.T.]) | 10 |
| Tinting Strength Index-Covering Power | 18 |
| Fixed carbon % | 99.5 |
| Volatile matter % | 0.5 |
| Apparent Density (lbs./cu.ft.): Powder | 33 |
| Beads | 38 |

The basic block copolymer - asphalt composition may also be modified by the addition of various synthetic and natural resins in an amount of up to about 50 parts per 100 parts of block copolymer and asphalt and preferably about 15 to 35 parts per 100 parts of block copolymer and asphalt. Suitable classes of resins and examples of each are as follows:

| | Class |
|---|---|
| A) Petroleum Based Resins: | |
| (1) Polycyclic hydrogenated hydro- | |

-continued

| | |
|---|---|
| carbon resin | Aliphatic |
| (2) Dark thermoplastic petroleum resins | High aromatic |
| (3) Polymers of beta pinene | Aliphatic |
| (4) Poly-indene hydrocarbon resins | High aromatic |
| B) Resins made from pure monomers | |
| (1) Low molecular weight pure polystyrene resin | Armomatic |
| (2) Polymers and copolymers of styrene and either nuclear and/or alkyl substituted styrenes | Aromatic |

A presently preferred synthetic resin of the aromatic hydrocarbon type is a copolymer resin of vinyl toluene and α-methyl styrene.

This resin is hard and friable in its solid state and exhibits excellent resistance to discoloration caused by oxidation, heat and ultraviolet light. In addition, this resin has good resistance to moisture, acids, salt water and alkalis. This resin may be utilized to control the physical strength of the membrane, improve adhesion, and decrease the moisture vapor transition rate. Typical properties of a vinyl toluene - α-methyl styrene resin are as follows:

| Typical Property Range | |
|---|---|
| Softening point, ball-and-ring | 75° C. – 160° C. |
| Color, Gardner Scale (maximum) | 1 |
| Specific Gravity | 1.04 |
| Acid Number, less than | 1 |
| Bromine Number (electrometric), less than | 1 |
| Ozone Number | 0 |
| Fire point, ° F. | 535 – 600 |

The fire-retardant property of the composition may be improved by incorporating therein minor amounts, usually from 15 to 25 parts per 100 parts of copolymer and asphalt, of chlorinated elastomers and rubbers, such as chlorinated polyethylene, chlorinated polypropylene, chlorinated rubber, etc. Chlorinated rubber with a fixed chlorine content minimum of about 64.5 weight % is presently preferred primarily because of its ease of dispersion.

Known stabilizers, such as anti-oxidants, anti-ozonants, and ultraviolet-light stabilizers, are also optionally incorporated in the composition, depending upon the contemplated surface conditions during application and use. Such compounds are known in the art and are usually employed in relatively small quantities (on the order of several weight % based on the weight of the block copolymer).

Various known solvents may be utilized in applying the composition as a coating. For example, aromatic hydrocarbon solvents, such as xylene (which is presently preferred in most instances) and toluene, and oxygenated solvents, such as ketones, are useful. The solvent system selected should comply with any government regulations for solvent emissions. The solvent system may be altered, depending upon conditions, in order to control evaporation rate; for example, in winter months, xylene is generally used because of its fast evaporation rate, and in summer months, less xylene and more slower-evaporating solvents are used.

The amount of solvent is usually several times that of the total weight of the solid components and is determined primarily, depending upon how the composition will be applied. Use of about 400 parts of solvent per 100 parts of block copolymer and asphalt is generally satisfactory.

For re-roofing, i.e. applying a membrane over an existing defective roof, a given formulation may be suitable for use over an extended area. The best formulation for specific conditions [temperature, humidity, rainfall, wind, UV and ozone exposure], however, will generally vary with those conditions, and appropriate modifications are readily made to satisfy prevailing conditions in the area of application and specific conditions at the time of application. Coating systems are formulated to protect and to add more years of service to existing conventional-type roofing.

The subject system is a true elastomeric system which is installed as a complete new roofing membrane compatible with and essentially independent of conventional-type roofing. It provides the necessary barrier to the elements.

EXAMPLES A–T

The following examples of formulations A–T set forth in Table I are illustrative of the present invention. In preparing these compositions for use in producing a base roofing membrane, the block copolymer is, e.g., initially placed in a holding tank, and then the solvent is pumped into the tank. The block copolymer is then dissolved in the solvent by mixing with a high speed disperser, for example a Cowles mixer, until the block copolymer is completely dissolved. The order in which the asphalt and any other additive, such as anti-oxidant, pigment, resin, etc., is added is not significant. Each ingredient is added and mixed under high-speed dispersion. After filtering to strain out any contaminants, the composition is ready for application by spraying or other technique, and the composition is usually placed into a suitable container pending its use.

Table II shows the tensile strength, ultimate elongation, and hardness of formulations A–T.

TABLE T

| FORMULATION: | A | B | C | D | E | F | G | H | I | J |
|---|---|---|---|---|---|---|---|---|---|---|
| Block Copolymer (GTX-0650 Rubber) | 95 | 90 | 80 | 60 | 95 | 90 | 80 | 60 | 95 | 90 |
| Asphalt | 5 | 10 | 20 | 40 | 15 | 10 | 20 | 40 | 15 | 10 |
| Calcium Carbonate | | | | | | | | | | |
| Medium Thermal non-staining carbon black | | | | | 15 | 15 | 15 | 15 | 15 | 15 |
| Copolymer of vinyl toluene/α-methyl styrene (Piccotex LC) | | | | | | | | | 40 | 40 |
| Chlorinated rubber | | | | | | | | | | |
| Anti-oxidant: 2,2'-methylenebis (4-methyl-6-tertiary-butyl phenol) | 3% | 3% | 3% | 3% | 3% | 3% | 3% | 3% | 3% | 3% |
| Solvent: Aromatic type, e.g., xylene | 400 | 400 | 400 | 400 | 400 | 400 | 400 | 400 | 400 | 400 |

TABLE T-continued

| FORMULATION: | K | L | M | N | O | P | Q | R | S | T |
|---|---|---|---|---|---|---|---|---|---|---|
| Block Copolymer (GXT-0650 Rubber) | 80 | 60 | 95 | 90 | 80 | 60 | 90 | 90 | 90 | 90 |
| Asphalt | 20 | 40 | 5 | 10 | 20 | 40 | 25 | 25 | 25 | 25 |
| Calcium Carbonate | | | 100 | 100 | 100 | 100 | 100 | 100 | 100 | 100 |
| Medium Thermal non-staining carbon black | 15 | 15 | 15 | 15 | 15 | 15 | 15 | 15 | 15 | 15 |
| Copolymer of vinyl toluene/α-methyl styrene (Piccotex LC) | 40 | 40 | 40 | 40 | 40 | 40 | 40 | 40 | 40 | 40 |
| Chlorinated rubber | | | | | | | 5 | 10 | 15 | 20 |
| Anti-oxidant: 2,2'-methylenebis (4-methyl-6-tertiary-butyl phenol) | 3% | 3% | 3% | 3% | 3% | 3% | 3% | 3% | 3% | 3% |
| Solvent: Aromatic type, e.g., xylene | 400 | 400 | 400 | 400 | 400 | 400 | 400 | 400 | 400 | 400 |

NOTE:
(1) All numerical values are parts by weight.
(2) Anti-oxidant quantity is 3% by weight of GXT-0650 (Example: 80 parts by weight of GXT-0650; then 3% of 80 = 2.40 parts of Anti-oxidant).

TABLE II

| | PHYSICAL PROPERTIES | | |
|---|---|---|---|
| FORMULATION | Tensile Strength at Break, psi | Ultimate Elongation, per cent | Hardness Shore A |
| A | 4300 | 560 | 78 |
| B | 3450 | 555 | 77 |
| C | 2770 | 545 | 76 |
| D | 1600 | 640 | 70 |
| E | 4325 | 520 | 82 |
| F | 3400 | 525 | 81 |
| G | 2800 | 560 | 79 |
| H | 1625 | 635 | 73 |
| I | 1600 | 490 | 83 |
| J | 1150 | 490 | 78 |
| K | 960 | 500 | 79 |
| L | 850 | 650 | 72 |
| M | 1150 | 400 | 90 |
| N | 1025 | 400 | 88 |
| O | 875 | 420 | 85 |
| P | 845 | 485 | 82 |
| Q | 875 | 400 | 85 |
| R | 870 | 400 | 86 |
| S | 860 | 380 | 85 |
| T | 850 | 360 | 86 |

A suitable white elastomeric top coating (for application in one or more layers over the base membrane of the invention) contains, as base elastomer, chlorosulfonated polyethylene, for example Hypalon, or a chlorinated rubber. Other ingredients of the top coating include pigment, such as titanium dioxide, extenders, organic solvents, anti-oxidants and the like. A typical top coating composition comprises:

| Ingredients | Parts by Weight |
|---|---|
| Chlorosulfonated Polyethylene | 50 |
| Chlorinated rubber | 15 |
| Titanium Dioxide | 55 |
| Clay | 20 |
| Magnesium Oxide | 12 |
| 2-mercaptoimidazoline | 1 |
| Solvent - xylene | 350 |
| Antioxidant | 1 |
| Dispersent | 1 |
| Thickening Agent | 2 |

Table III compares the results of tests based on applying (to a film of the block copolymer without asphalt and to films of formulations A to D, N, O and P) a top coating as specified above in (a) a single coat, and (b) in two coats. The various compositions were applied to plywood, cold roller steel, concrete, aluminum and asphalt felt substrates. As is evident from the data in Table III, there are material improvements in bonding between the base layer and the top coating, whether it was applied in one or two coatings when employing the compositions of the present invention, rather than a base film of the block copolymer without any asphalt (the first column of the table).

TABLE III

| | | ADHESION AND COHESION STUDY | | | | | | | | | | | | | | |
|---|---|---|---|---|---|---|---|---|---|---|---|---|---|---|---|---|
| FORMULATION | | Block Copolymer alone | | A | | B | | C | | D | | N | | O | | P |
| NUMBER OF BASE COATS | | One | Two | One | Two | One | Two | One | Two | One | Two | One | Two | One | Two | One | Two |
| SUBSTRATE: PLYWOOD POINT OF FAILURE: | A* B** C*** | 22 | 22 | 33 | 33 | 40 | 38 | 42 | 42 | 40 | 38 | 60 | 57 | 53 | 47 | 56 | 48 |
| SUBSTRATE: COLD ROLL STEEL POINT OF FAILURE: | A* B** C*** | 7 | 8 | 20 | 21 | 25 | 24 | 26 | 26 | 23 | 23 | 44 | 43 | 47 | 47 | 39 | 41 |
| SUBSTRATE: CONCRETE POINT OF FAILURE: | A* B** C*** | 20 | 21 | 30 | 32 | 38 | 42 | 43 | 41 | 37 | 36 | 58 | 58 | 53 | 52 | 47 | 47 |
| SUBSTRATE: ALUMINUM | | | | | | | | | | | | | | | | | |

TABLE III-continued

ADHESION AND COHESION STUDY

| FORMULATION | | Block Copolymer alone | | A | | B | | C | | D | | N | | O | | P | |
|---|---|---|---|---|---|---|---|---|---|---|---|---|---|---|---|---|---|
| NUMBER OF BASE COATS | | One | Two | One | Two | One | Two | One | Two | One | Two | One | Two | One | Two | One | Two |
| POINT OF FAILURE: | A* | 7 | 7 | 21 | 20 | 24 | 24 | 25 | 26 | 25 | 24 | 40 | 40 | 46 | 45 | 41 | 37 |
| | B** | | | | | | | | | | | | | | | | |
| | C*** | | | | | | | | | | | | | | | | |
| SUBSTRATE: ASPHALT FELT | | | | | | | | | | | | | | | | | |
| POINT OF FAILURE: | A* | 11 | 13 | 29 | 34 | | 34 | 34 | | | 30 | | 37 | | 41 | 38 | |
| | B** | | | | | 33 | | | 36 | 31 | | 38 | | 39 | | | 36 |
| | C*** | | | | | | | | | | | | | | | | |

A* ADHESION FAILURE psi. PERPENDICULAR PULL
B** COHESIVE FAILURE psi. PERPENDICULAR PULL (WITHIN BASE)
C*** ADHESIVE FAILURE psi. (OF WHITE TOP COAT TO BASE MEMBRANE)

Whereas there was essentially no mud-cracking evidenced by the samples in accordance with the invention, mud-cracking occurred on all substrates when using the block copolymer alone. On a scale of 1 to 10, where 10 is the worst cracking, the first coating of block copolymer without asphalt on all substrates would rate a value of 8 and, when employing two coatings for applying the top coating, the use of the block copolymer alone would rate 10 on all substrates.

The following illustrates one application of the present invention to correct deficiencies in an existing roof system. The initial roofing system had been applied to a plywood deck, and the materials used were asphalt and asphalt-impregnated felts. This type of conventional roofing is referred to as "smooth roofing". The problem with this roofing system centered around split felts and deterioration of the system resulting in leaks. In addition, the black surface caused high heat build-up during the summer months, resulting in higher cost for air conditioning.

The above-mentioned problems were overcome by applying an elastomeric base coating similar to formulations O and P of Table I. After the base membrane had dried, a white finish coat of the previously-described type was applied. Inspection of the roof showed that there was no mud-cracking in the base membrane and a lack of staining of the white finish coat. Such a re-roofed system has an estimated life expectancy of over 20 years and, because of the white coating, results in a cooler structure and reduced air-conditioning costs, whereas the initial roofing system had a life expectancy of from 2 to 3 years.

When reroofing over an existing old asphalt roof, it is essential that the solvent employed in the roofing composition has sufficient penetration and a suitable evaporation rate. This combination of properties makes it possible to use the solvent to leaf up oils and particles from the old asphalt and unite them with the asphalt and elastomeric B-block for a good bond, including bonding to any gravel remaining on the old roofing. Such a system vastly improves tolerance to dirt, while retaining a good bond.

With a roofing composition according to this invention, exceptional bonding to existing roofing is demonstrated by the leading edge of newly-applied composition, which remains bonded. The leading edge does not curl up in time, nor is it released from the old roofing. Even when adjacent old roofing takes up moisture, such moisture has virtually no ill effect on the subject new roofing.

The elastomeric midblock actually serves as a binder for other ingredients, such as antioxidant [e.g. Plastanox 2246 - 2,2'-methylene-bis(4-methyl-6-t-butylphenol) and Plastanox 425 -2,2'-methylene-bis(4-ethyl-6-t-butylphenol)], surfactant [e.g. Nuosperse 657 — an amber-colored liquid non-ionic dispersing agent for solvent-based coatings which facilitates pigment dispersion and acts to a small degree as a defoaming agent], filler [e.g. Gamasperse 6532 —calcium carbonate (specific gravity 2.71) which also acts partially as a reinforcing agent], pigment [e.g. MTNS Carbon Black — a medium thermal non-staining carbon black in powder form (for ease of dispersion) which serves as a film re-inforcer and ultraviolet light screeening agent], resin [e.g. Piccolastic D-100 — flake-form pure styrene resin (specific gravity 1.06) which serves as a film reinforcer and to improve adhesion] and cut-back asphalt.

Suitable formulations for base roofing (or reroofing) and top-coat compositions are presented in the following examples. In Example U preferred ingredients are illustrated. About one pound of KRATON G rubber GX 6500 is used per gallon of the formulation as this is:

a. about the maximum quantity that still allows a sprayable viscosity, b. sufficient rubber to allow substantial extension with pigment and filler, and c. sufficient rubber to permit maximum plasticization with asphalt without any appreciable degree of staining of a top coat applied thereto.

The KRATON G rubber GX 6500 has advantageous physical properties, including:

a. low percent weight increase on immersion in distilled water, b. lack of need for any curling agent, c. good ozone and oxidation resistance, and d. low-temperature flexibility and good elongation at −40° C.

Xylene is a solvent for GX 6500. The xylene provides means for viscosity adjustment of the formulation; it also "wets outs" the pigmentation during dispersion. The quantity of xylene is based on desired viscosity and controls the solubility parameter of the total solvent system. Xylene has a solubility parameter approximating that of the total solvent system as well as that of GX 6500.

Antioxidant 2246 circumvents oxidation degradation of GX 6500. Even though GX 6500 has good oxidation resistance, the presence of UV and heat promote a degree of oxidation of GX 6500. The degree of oxidation is dependent on the increase of either or both UV radiation and temperature. The quantity of 2246 is at the maximum level. W-O-M studies indicate this level to be most effective. A primary advantage of this antioxidant is its non-staining of subsequent white top coats.

Nuosperse 657 is a dispersant which promotes easier dispersion of the pigmentation.

Calcium Carbonate is an extender pigment. The quantity is based on
a. effects on film properties,
b. control of asphalt staining, and
c. volume solids — increase in mils per gallon per 100 square feet.

MTNS Carbon Black functions as a film reinforcer and UV screening agent. The level of use is based on the maximum amount necessary for complete UV screening and ease of dispersion. The amount is adjustable to control film splitting during thermal shock caused by temperature changes. There is a delay in reaction time of the membrane when hit by thermal shock. When a split occurs, a leak is present. Shortly thereafter, the split closes and the leak stops even though a layer of water remains over the split area.

Piccolastic D-100 is a reinforcing and adhesion-promoting resin. The level of use is based on reinforcing and adhesion qualities imparted to the formulation without detrimental effects on elongation, flexibility and low temperature properties.

Piccolastic D-100 has excellent water resistance, thermal stability and chemical resistance.

Cut-back asphalt functions as a plasticizer and adhesion promoter. It also increases the compatibility of the formulation with old asphalt gravel roofs. The quantity used is based on the maximum level possible without detrimental effect on a top coat and the maximum level of plasticization.

The cut-back asphalt is the ingredient which contributes to the ability of the membrane to tolerate oils and grease after the surface is solvent cleaned. Regardless of cleaning techniques, an oil or grease contamination remains. This is a cost saving for the overall system.

EXAMPLE U

| Ingredients | Parts by Weight | Parts by Volume |
|---|---|---|
| GX 6500 [KRATON G rubber GXT 0650 or KRATON G 1650] | 12.4 | 13.3 |
| Xylene* | 43.3 | 47.8 |
| Hi Sol No. 10** | 22.4 | 25.0 |
| Plastanox 2246 | 0.5 | 0.5 |
| Nuosperse 657 | 0.3 | 0.2 |
| MTNS Carbon Black | 0.6 | 0.3 |
| Gamasperse 6532 | 11.2 | 4.0 |
| Piccolastic D-100 | 4.3 | 3.9 |
| Asphalt (40–20 RC) | 5.0 | 5.0 |

*water-clear aromatic solvent with a flash point of 81° F (27.2° C) and a specific gravity of 0.87.
**an aromatic solvent with a flash point of 110° F (43° C) and a specific gravity of 0.88.

Charge a mixing container with the KRATON G rubber GX 6500 then add all of the xylene thereto. Place the mixing container under a disperser and add 15 parts by volume (13.6 parts by weight) of the Hi Sol 10 before starting high-speed dispersion. Thereafter, add thereto the Plastanox 2246 and then the Nuosperse 657 under high-speed agitation. Continue high-speed dispersion until at least 80 percent of the GX 6500 has been cut in. Continue high-speed dispersion while adding the carbon black, Gamasperse 6532 and Piccolastic D-100. High-speed disperse for at least 15 additional minutes and until the GX 6500 and the carbon black are completely dispersed.

Then reduce the agitation to medium speed, add the asphalt to the previously-obtained admixture and disperse at medium speed for from 4 to 5 minutes before reducing the agitation to low speed. Thereafter add 10 parts by volume (8.8 parts by weight) of Hi Sol 10 to the contents of the mixing container and continue under slow agitation for from 2 to 3 minutes.

The resulting admixture is a base roofing (or reroofing) composition suitable for application to a roof and is now ready for packaging and labelling.

EXAMPLE V

| Ingredients | Parts by Weight | Parts by Volume |
|---|---|---|
| Hypalon 30[1] | 15.8 | 14.65 |
| Parlon 20[2] | 0.5 | 1.39 |
| Xylene[3] | 53.5 | 68.35 |
| Plastanox 2246 (or Plastanox 425) | 0.3 | 0.35 |
| Nuosperse 657 | 0.4 | 0.49 |
| Ranc-Titanox 2062 [rutile $TiO_2$][4] | 18.5 | 4.99 |
| Lectro 78 [tetrabasic lead fumarate][5] | 3.7 | 0.62 |
| MPA-60[6] | 1.3 | 1.68 |
| MBTS [2,2'-benzothiazyl disulfide][7] | 0.2 | 0.12 |
| Stabelite Resin[8] (hydrogenated wood rosin) | 0.4 | 0.47 |
| UCD 4830A Phthalo Blue[9] | 0.1 | 0.06 |
| UCD 8060A Bon Red[10] or UCD 6080A Red Oxide[11] | 0.1 | 0.06 |

[1]chlorosulfonated polyethylene rubber in chip form and characterized by little or no odor, good color stability on storage (high oxidation and ozone resistance) and resistance to burning.
[2]non-toxic highly-chlorinated rubber (in free-flowing white granular powder form) with no apparent odor, excellent storage stability, adhesion-improvement, fire-resistance and non-blocking characteristics.
[3]same as that used in Example U.
[4]non-chalking white pigment in powder form.
[5]vulcanizer in the form of a fine creamy-white powder with excellent storage stability.
[6]thickening agent with a white waxy appearance and a specific gravity of 0.88.
[7]a general-purpose storage-stable accelerator (in free-flowing pale-yellow powder form) used with Lectro 78.
[8]accelerator with good storage stability and a specific gravity of 1.01; pale, thermoplastic acidic resin highly resistant to oxidation and discoloration when exposed to air and sunlight.
[9]product of duPont, BT-284D pigment.
[10]product of duPont, RT-455D pigment.
[11]product of Columbian, No. 387 pigment.

Charge a mixing container with the Hypalon 30 and the Parlon 20 before adding the xylene and Hi Sol 10 thereto. Allow at least 48 hours for solids to dissolve. Then mix the contents of the container thoroughly under a disperser to form a rubber coat.

Charge a further mixing container with 48.8 parts by volume of the rubber cut. Under high-speed mixing in the further mixing container add to the contents thereof the Plastanox 2246, the Nuosperse 657, the Ranc-Titanox 2062 and the Lectro 78. High-speed mix for at least 15 or 20 minutes and until the Ranc-Titanox is completely mixed. Then add the MPA-60 to the contents of the container. Medium-speed mix the resulting admixture for 5 minutes or until thorough admixture is achieved.

Under medium-speed mixing add the MBTS and the Staybelite resin to the contents of the further mixing container, and continue such mixing for five minutes before reducing the agitation to low-speed agitation and adding the remainder of the rubber cut (about 42.43 parts by volume) to the resulting admixture. Under continued slow agitation add the UCD 4830A and the UCD 8060A to the contents of the further mixing container. Continue low-speed agitation for 2 or 3 minutes.

The resulting admixture is a white top-coat composition suitable for applying over a base roofing composition (such as that formed according to Example U) and is now ready for packaging and labelling.

The principles of the present invention can be applied to many substrates, including even the roof of a mobile home. The major drawbacks associated with conventional roofs of mobile homes include the rumble noise of the roof during moderately high winds, noise resulting from rain striking the roof, and splits at the metal seams. Formulations similar to M and N of Table I have been used as base elastomeric membranes which were coated with a white finish coating. The high tensile strength of the base membrane improved the roof deck rigidity, and yet there were sufficient elastomeric properties to span the opening and closing of splits at the seams. Again, upon observation, there was no mud-cracking in the base membrane and no staining of the white finish coating. The elastomeric system alleviated the rumble and noise resulting from rain. Generally, the roof color of a mobille home is aluminum and the temperature differential of aluminum versus white is approximately 25° F. A minor savings is realizable in air-conditioning costs when utilizing the roofing of the present invention.

Economical re-roofing of old gravel roofs generally requires spray application. For such application the solids content of the fluid composition is a significant factor. Although compositions having a solids content as high as, e.g., 94 percent may actually spray fairly well in extremely hot weather, such a solids content is too high for good spraying under normal conditions or even at elevated temperatures. Merely adding solvent to thin a high-solids composition ordinarily does not provide satisfactory results.

The composition cure rate is an important factor. Curing involves the development of physical properties and is not to be confused with drying. Rapid drying is not important. The longer a film takes to cure, the more problems it presents. Until a film is cured, each exposure to moisture reduces the quality of the finished product.

The moisture problem is compounded when a mat or glass fiber is used for reinforcing. The reinforcing will hold moisture, thus creating a mid layer of membrane which will deteriorate. The subject system has the required tensile strength even without any reinforcement.

From the foregoing detailed description, it is evident that many changes and modifications may readily suggest themselves to those of ordinary skill in the art upon being apprised of the present invention. It is intended to encompass all such changes and modifications as fall within the scope and spirit of the appended claims.

What is claimed is:

1. In a fluid, curable roofing composition which is free from terminally-reactive diolefin polymer and from a curing or vulcanization agent and which comprises an intimate admixture of elastomer and asphalt, the improvement wherein:
   a. the elastomer is in the form of a midblock B of an A-B-A block copolymer wherein each end block A is a polymer block of a polymerized vinyl aromatic monomer and the midblock B is a polymer block of polymerized aliphatic hydrocarbon monomer, the polymerized aliphatic hydrocarbon monomer having at most a proportion of olefinic unsaturation which is significantly less than that of a polydiene or of a polymerized mixture of dienes,
   b. the block copolymer is in solution in a solvent,
   c. the asphalt has a softening point of from about 100° to about 175° F,
   d. the weight percent of A-B-A block copolymer is from about 60 to about 95 percent and
   e. the weight percent of asphalt is from about 40 to about 5 percent, the respective weight percents being based on the total amount of A-B-A block copolymer and asphalt in the roofing composition.

2. A composition according to claim 1 wherein the average molecular weight of each A endblock is from about 8,000 to about 45,000, and the average molecular weight of the B midblock is from about 40,000 to about 125,000.

3. A sprayable composition according to claim 1 wherein the elastomer and asphalt are essentially uniformly dispersed in solvent.

4. A composition according to claim 1 wherein each endblock A is a styrene polymer.

5. A composition according to claim 1 wherein the polymerized aliphatic hydrocarbon is polybutadiene and the A-B-A block copolymer is in a hydrogenated form in which unsaturation of the polybutadiene is significantly reduced.

6. A composition according to claim 1 wherein midblock B is a polymerized mixture of mono-olefins.

7. An asphalt-base roof intimately bonded to solids of a roofing composition according to claim 6.

8. An asphalt-base roof covered with and intimately bonded to solids of a roofing composition according to claim 6 and which further bears a white finish coating.

9. A composition according to claim 6 wherein the mixture is that of ethylene and butylene.

10. A composition according to claim 9 wherein the butylene is isobutylene.

11. A composition according to claim 1 which further comprises from about 15 to about 100 parts by weight of medium thermal non-staining carbon black per 100 parts by weight of the block copolymer.

12. A composition according to claim 11 which further comprises a minor proportion of hydrocarbon resin.

13. A composition according to claim 12 wherein the resin is a copolymer of vinyl toluene and α-methylstyrene.

* * * * *

UNITED STATES PATENT OFFICE
CERTIFICATE OF CORRECTION

Patent No. 4,032,491     Dated June 28, 1977

Inventor(s) William Emil Schoenke

It is certified that error appears in the above-identified patent and that said Letters Patent are hereby corrected as shown below:

Column 1, line 47, "inprove" should read --improve--. Column 2, line 48, "flexible" should read --*flexible*--; line 49, "watertight" should read --*watertight*--; line 51, "less costly" should read --*less costly*--; line 56, "Smooth Surface (no gravel) Roofs" should read --*Smooth Surface (no gravel) Roofs*--; line 64, "intolerble" should read --intolerable--. Column 3, line 25, "S.I.S. or Shingle Roofs" should read --*S.I.S. or Shingle Roofs*--; line 26, "Gravel Surfaced Roofs: should read --*Gravel Surfaced Roofs*--. Column 4, line 43, "ashalt" should read --asphalt--. Column 5, line 47, "easly" should read --easily--; line 62, "spohisticated" should read --sophisticated--; line 64, "contaimination" should read --contamination--. Column 6, line 21, "comprises" should read --comprise--; line 27, "block" should read --blocks--; line 67, "need" should read --need for--. Column 7, line 37, "IN" should read --In--; line 43, "xylene," should read --xylene.--; line 44, "dersirable" should read --desirable--. Column 8, lines 55 to 56 (approximately) should read:   --Apparent Density (lbs./cu.ft):   Powder         33
                                     Beads          38--.
Column 10, approximately line 53, "TABLE T" should read --TABLE I--; approximately line 58 (second line of each of columns E and I) "15" should read --5--. Column 11, line 1, "TABLE T" should read --TABLE I--; approximately line 6 (third line under M), "100 100" should read --100--. Column 12, approximately line 6 (third line under T), "    " should read --100--; line 41, "roller" should read --rolled--. Column 14, line 20, "425 -2,2'-" should read --425 - 2,2'- --. Columns 15 and 16, at approximately lines 43 and 44, between the lines beginning with "Xylene$^3$" and "Platanox 2246..." should read:
--Hi Sol No. 10                      5.4              6.84--.
Column 16, line 6, "Hi Sol No. 10**22.4   25.0" should read:
--Hi Sol No. 10**                    22.4             25.0--.
Column 17, line 41, "mobille" should read --mobile--. Column 18, lines 28 through 30, "about 5 percent,...composition." should read:
     --about 5 percent,
the respective weight percents being based on the total amount of A-B-A

UNITED STATES PATENT OFFICE
CERTIFICATE OF CORRECTION

Patent No. 4,032,491   Dated June 28, 1977

Inventor(s) William Emil Schoenke

It is certified that error appears in the above-identified patent and that said Letters Patent are hereby corrected as shown below:

block copolymer and asphalt in the roofing composition.--.

Signed and Sealed this

Seventh Day of February 1978

[SEAL]

Attest:

RUTH C. MASON
Attesting Officer

LUTRELLE F. PARKER
Acting Commissioner of Patents and Trademarks